J. M. SPITZGLASS.
PITOT TUBE.
APPLICATION FILED MAR. 29, 1915.
1,250,238.
Patented Dec. 18, 1917.
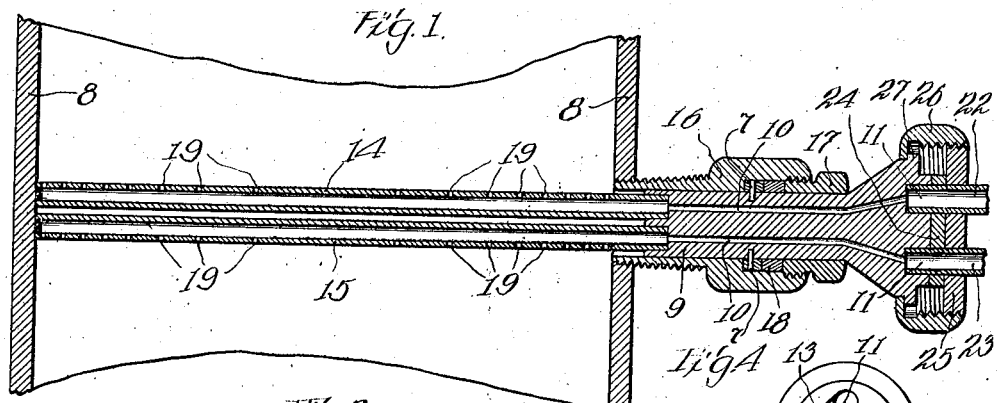
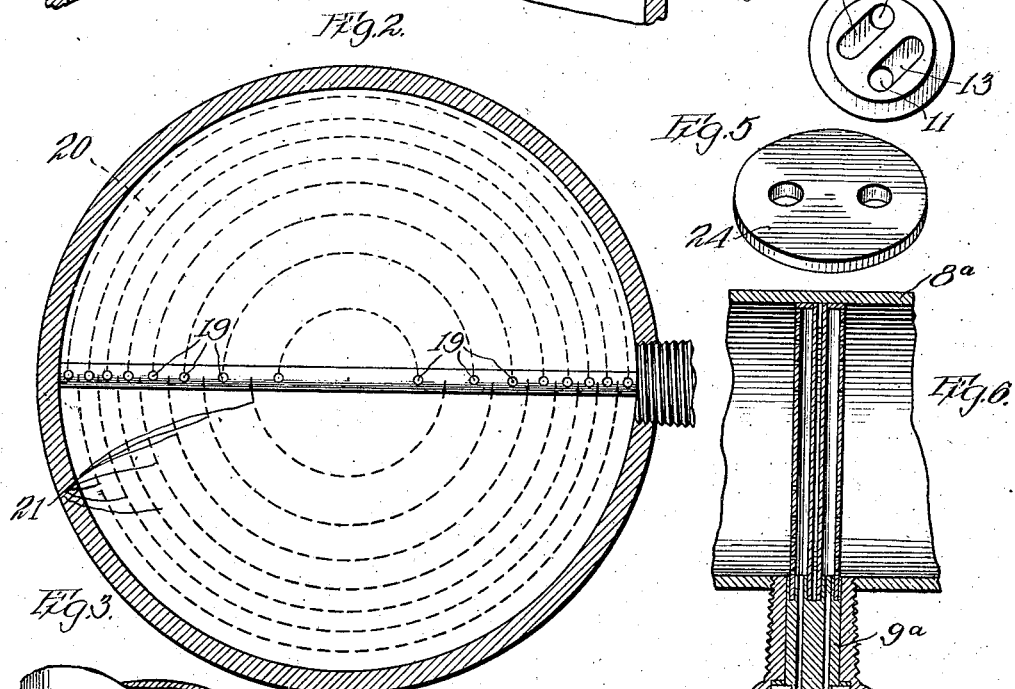
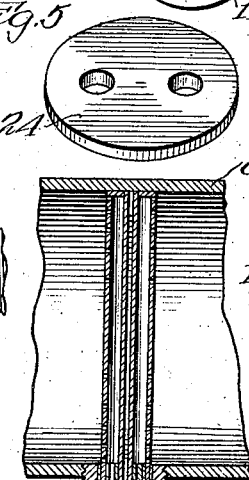
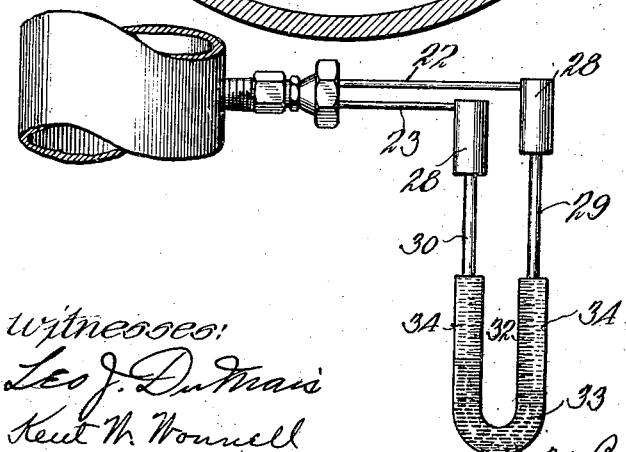

UNITED STATES PATENT OFFICE.

JACOB M. SPITZGLASS, OF CHICAGO, ILLINOIS.

PITOT TUBE.

1,250,238.  Specification of Letters Patent.  Patented Dec. 18, 1917.

Application filed March 29, 1915. Serial No. 17,832.

*To all whom it may concern:*

Be it known that I, JACOB M. SPITZGLASS, a citizen of the United States, residing at Chicago, in the county of Cook and State of Illinois, have invented certain new and useful Improvements in Pitot Tubes, of which the following is a specification.

This invention relates to the inferential method of measuring fluids by means of a Pitot tube which transmits the pressure equivalent of the velocity of a fluid in a pipe or conduit to suitable outside means for indicating or recording the volume of fluid flowing through the conduit. The principal object of the invention is to provide an improved form of Pitot tube which transmits pressure difference actuated by the mean velocity of a fluid throughout the entire cross-sectional area of the pipe or conduit in contradistinction to the average velocity in the pipe.

Other objects will be hereinafter set forth.

In the accompanying drawing, Figure 1 is a view in section of a Pitot tube constructed in accordance with the principles of my invention and applied to a pipe where the flow of fluid is to be measured; Fig. 2 is a cross-section of a pipe illustrating the manner in which the location of the openings of the applicant's tubes is determined; Fig. 3 is a diagrammatic illustration of a Pitot tube of this class as employed in connection with an indicating apparatus; Fig. 4 is a view of the outer end of the plug member; Fig. 5 is a perspective of a washer used in connection with the tube, and Fig. 6 is a view in section of a modified form of tube.

This invention is based on the theory that the areas of concentric rings of equal width for any given circle are greater toward the circumference of a circle from the center varying in accordance with the odd number series 1, 3, 5, 7 and so on. The velocity of a fluid in any cross section of a circular conduit is considerably higher at the center of the conduit and diminishes as the circumference is approached, due to frictional resistance of the walls of the conduit, depending greatly upon the roughness of the walls and the velocity of the fluid. It is obvious, therefore, that the average velocity in the pipe measured along a single diameter with openings at equal distances apart without having any reference to the area served by each opening, is a false index of the mean volume of fluid which passes through the conduit.

For instance, in a cross-section having a radius of ten inches, if the velocity is measured in ten points one inch apart along a radius of the section it will show only the average velocity along a given diameter but it will not show the weighted mean velocity which is much different from the average and is of such magnitude that if it were the same over the whole cross-section of the conduit it would transmit a volume of the fluid actually transmitted by the different velocities in the different parts of the cross-section. Let us assume that the velocities at the ten points measured on the radius one inch apart are represented in feet per second by the following:

| | |
|---|---|
| First | 100 |
| Second | 99 |
| Third | 98 |
| Fourth | 96 |
| Fifth | 93 |
| Sixth | 90 |
| Seventh | 86 |
| Eighth | 80 |
| Ninth | 70 |
| Tenth | 48 |

Average=860 divided by 10= 86 feet per second.

The areas of the rings of equal width where these velocities occur are in accordance with the odd number series described above, which is obtained by subtracting the area of the inner circle from the area of the next outer circle, the odd number series representing the proportional area of each succeeding ring related to the area of the first circle whose radius is the width of the rings; that is, the entire volume passing through the pipe is represented as follows:

| Points. | Velocity. | Area. | Volume=area× velocity. |
|---|---|---|---|
| First | 100 | 1 | 100 |
| Second | 99 | 3 | 297 |
| Third | 98 | 5 | 490 |
| Fourth | 96 | 7 | 672 |
| Fifth | 93 | 9 | 837 |
| Sixth | 90 | 11 | 990 |
| Seventh | 86 | 13 | 1118 |
| Eighth | 80 | 15 | 1200 |
| Ninth | 70 | 17 | 1190 |
| Tenth | 48 | 19 | 912 |
| | | 100 | 7806 |

To obtain a volume represented by 7806 with an even velocity through the 100 equal areas of the cross-section, that velocity must be 7806 divided by 100 or 78.06 feet per second, which is the weighted mean velocity for that cross-section which differs materially from the average velocity of 86 feet per second, as shown above.

Owing to the fact that frictional resistance in the conduit is a variable quantity, also due to eddy currents and other irregularities in the flow, the weighted mean velocity in the conduit bears an unknown relation to the average velocity in the same conduit, thus resulting in inaccurate indications by all inferential meters actuated by the average velocities in the conduit, and this inaccuracy is entirely eliminated by the use of this improved Pitot tube which is actuated by the weighted mean velocity of fluid in the cross-section and not by the average velocity, as in the old forms of Pitot tubes.

In the drawing, the numeral 8 designates, generally, a pipe or conduit in which the flow of fluid is to be measured. The Pitot tube comprises a plug member 9 with bores 10 extending through it and preferably spaced apart at its outer end where larger bores 11 are provided. At right angles to the ends of the bores 11 are passages 13 so that the plug member may be used either in a horizontal or vertical pipe. Attached to the inner end of the plug members and in communication separately with each of the bores 10 are two perforated tubes 14 and 15, of which the one which receives the direct impact of fluid in the pipe 8 is referred to as the dynamic tube, and the other one in which the openings are turned in the opposite direction is called the static tube. A sleeve 16 is threaded into the tube 8 and into this sleeve the plug member 9 fits closely but loosely. A packing gland 17 has a threaded connection with the sleeve and a collar 7 is secured to the plug member 9 to hold it and the sleeve together. The packing member 18 forms a fluid-tight connection between the plug member 9 and the sleeve 16.

The static and dynamic tubes are made exactly alike and have openings 19 which correspond with each other. The tubes are of such a length that when inserted within a pipe, they extend diametrically across it from one wall to the other. It is preferable to have the tubes extend from one wall to the other, for the pressure transmitted by the tube is more truly a mean value, and the tubes can be more accurately positioned within the pipe.

To obtain the pressure difference corresponding to the weighted mean velocity in the pipe a cross-section of the pipe 8, as shown in Fig. 2, is divided into an even number of concentric rings of the same area represented by the semi-circular dotted lines 21. Each equal area is served by two openings 19 which are spaced not at the exact center between two adjacent lines 21 but at the center of the area determined by division lines 20. One of the openings 19 is placed at the intersection of each of these lines 20 with a diameter thus determining the position of the openings in one of the tubes 14 or 15 for a given size pipe and for a given number of openings.

It is obvious according to the theory upon which this invention is based, that when the static and dynamic tubes are inserted in the pipe they should be placed in such a manner that the openings of the tubes receive the full impact and the full suction of the flow of fluid in the pipe. By having the tubes exactly alike the pressure differences of corresponding openings in the static and dynamic tubes will indicate the weighted mean velocity in the cross-section of the pipe, as above explained.

In order to properly space the openings of the tubes, and to make each opening represent an equal section of flow, it is necessary to space the openings apart numbering them in order from the middle of the tube, corresponding to the center of the pipe and making the distances from that middle point to the successive openings in proportion to the series:

$$1, 3, 5, 7, \text{ and so on.}$$

Following is a proof of the proposition:

Let $r_1, r_2, r_3 \ldots r_{n-1}, r_n$ represent the distance from the center of the pipe to the successive openings on both sides of the center.

Let R represent the inside radius of the pipe; N, the total number of openings in the Pitot tube.

The whole cross-sectional area is equal to $\pi R^2$, and the portion of area represented by a single opening is therefore equal to $$\frac{\pi R^2}{N}.$$

Since there are two openings in each concentric ring, therefore the area of the circle whose circumference crosses the first pair of openings is equal to one half of two portions, or $$\frac{\pi R^2}{N};$$

the area of the circuit whose circumference crosses the second pair of openings is equal to three portions, or $$\frac{3\pi R^2}{N};$$

the third pair is crossed by a circle inclosing five portions, or equal to $$\frac{5\pi R^2}{N},$$

and so on.

The corresponding areas can also be represented by $$\pi r_1^2, \pi r_2^2, \pi r_3^2 \ldots r_{n-1}^2, r_n^2.$$

Therefore:

$$\pi r_1^2 = \frac{\pi R^2}{N}$$

$$\pi r_2^2 = \frac{3\pi R^2}{N}$$

$$\pi r_3^2 = \frac{5\pi R^2}{N}$$

$$r_{n-1}^2 = \frac{(2n-3)R^2}{N}$$

$$r_n^2 = 2n - \frac{1 R^2}{N}$$

This can be written;

$$r_1 = R\left(\frac{1}{N}\right)^{\frac{1}{2}}$$

$$r_2 = R\left(\frac{3}{N}\right)^{\frac{1}{2}}$$

$$r_3 = R\left(\frac{5}{N}\right)^{\frac{1}{2}}$$

$$r_{n-1} = R\left(\frac{2n-3}{N}\right)^{\frac{1}{2}}$$

and in general $$r_n = R\left(\frac{2n-1}{N}\right)^{\frac{1}{2}} = \frac{R}{(N)^{\frac{1}{2}}} \times (2n-1)^{\frac{1}{2}}$$

From this it is obvious that the distance of any opening from the center of one of the tubes can be determined, or the distance of any two openings from each other can be found if the diameter of the pipe and the number of openings in the Pitot tube are definitely known. The expressions for stating the spacing of the openings may be given as follows: The openings are spaced so that the distance is proportional to the square root of twice the numerical order of the opening from the center minus 1; or, the distance between two successive openings in order $n_1$ and $n_2$ is proportional to:

$$\sqrt{2n_1 - 1} - \sqrt{2n_2 - 1}$$

This latter may be stated: The distance between two successive openings is proportional to the difference btween the square root of $2n_1$—1 and the square root $2n_2$—1.

In order to connect the Pitot tube to an indicating or registering mechanism a pair of tubes 22 and 23 is adapted to be connected to the enlarged bores 11 through a washer 24 which is shown in perspective in Fig. 5. The ends of the tubes 22 and 23 are inserted in the bores 11 or in passages 13, as shown in Fig. 4, depending upon whether the pipe to which the Pitot tube is connected is a horizontal pipe or a vertical pipe. A fluid-tight connection is made between the tubes 23 and 22 and the plug member 9 by means of a threaded member 25 through which the tubes are connected, and by means of a threaded sleeve 26 which engages a shoulder 27 of the plug member 9 and draws the member 25 tightly against the washer or gasket 24. It will be noted that the passages 13 are not in the form of an arc of a circle, therefore there is no tendency of the tubes 22 and 23 to turn with respect to the plug member 9 for the tubes will strike the sides of the passageways 13 and tend to prevent their relative rotation. In Fig. 3 the tubes 22 and 23 are connected to reservoirs 28 and thence by means of tubes 29 and 30 to an indicating device comprising a U-tube 31 with graduations 32 thereon for indicating the difference in pressure between the static and dynamic tubes of the Pitot tube. If desired, the U-tube may contain a liquid of different density, as indicated by the heavier lines 33 at the bottom of the U-tube and the fluid 34 above it may be from a condensable vapor, such as steam, in which case the reservoirs 28 are required, but if the flow of air is to be measured the reservoirs will not ordinarily be required.

In the form of the invention shown by Fig. 6 the Pitot tube is constructed substantially as shown in Fig. 1 with the exception that at the outer end of a plug member 9ª corresponding to the plug member 9 of the other tube, two separate threaded extremities 35 are formed which are provided with inclined bores 36 communicating with the bores 10 and in each of these inclined bores 36 is a cock 37 for controlling the opening through the bore. The manner of construction of the static and dynamic tubes of this form is exactly the same as in the form illustrated by Fig. 1; the pipe 8ª, however, being shown in a horizontal position, indicating that this Pitot tube is as well adapted to be used in a horizontal pipe as in a vertical pipe, and also, as explained above, as well adapted for registering or recording the pressure difference of a condensable fluid such as steam, as of a fluid such as air or gas.

What I claim is:

1. A Pitot tube of the class described, having a perforated tube adapted to be inserted in a pipe in which the flow of fluid is to be determined, with the openings spaced irregular distances apart in such a manner that the distance from the center of the pipe to each opening is proportional to the square root of twice its numerical order minus 1.

2. In a device of the class described, static and dynamic tubes each having a plurality of perforations spaced unequal distances apart, the distance of each opening from the center of the pipe being proportional to the spuare root of twice its numerical order therefrom minus 1.

3. In a device of the class described, a tube having a plurality of perforations spaced apart unequal but predetermined distances so that the distance between two successive openings in order $n_1$ and $n_2$ from the center is proportional to:

$$(2n_1-1)^{\frac{1}{2}} - (2n_2-1)^{\frac{1}{2}}.$$

4. In a device of the class described, a tube to extend across a pipe of given diameter with a plurality of openings in the tube spaced different distances apart but symmetrically arranged on both sides of the center of the pipe in which it is inserted, the distance from the center to each opening being proportional to the square root of twice its numerical order minus 1.

5. In a device of the class described, a tube adapted to extend diametrically across the interior of a pipe of a predetermined diameter and having a plurality of apertures each disposed between the circumferences of two imaginary concentric circles which define annular sections of equal area, the inner circle of each annular section being the outer circle of another section, and the total area of all the sections being equal to the cross section of the flow passage of the pipe, to indicate the weighted mean velocity of the entire cross section of a fluid flowing in the pipe.

6. In a device of the class described, a tube provided with a plurality of apertures arranged between the circumferences of annular spaces of equal area on each side of a central point, the inner circle of each annular space being the outer circle of another annular space, and the total area of all the annular spaces being equal to the cross section of the flow passage of the pipe.

7. In a device of the class described, a tube adapted to be inserted in a pipe of given size with a plurality of perforations arranged symmetrically with respect to the center of the pipe, and at a distance apart determined by the number of perforations in the pipe so that each pair of perforations will be located between the circumferences of a ring on each side of the center of the pipe, the inner circle of each ring being the outer circle of another ring, and the rings being of equal area and the total area of all the rings being equal to the cross section of the flow passage of the pipe.

8. In a device of the class described, the combination with static and dynamic tubes each having perforations similarly arranged but turned in opposite directions in a pipe to which the device is applied, the perforations of each tube being arranged to transmit the pressure difference due to the weighted mean velocity of fluid flow in a cross section of pipe equal in interior diameter to the length of the said tubes, the perforations being spaced apart from a central point on each tube so that the distance between two successive openings in order $n_1$ and $n_2$ from the center is proportional to the difference between the square root of $2n_1-1$ and the square root of $2n_2-1$.

9. In a device of the class described, the combination with a plug member having bores therethrough, of tubes secured to the member and communicating with the bores, a pipe to which the device is attached, a sleeve threaded through the pipe and in which the plug member is movable, and a gland for forming a fluid-tight connection between the sleeve and the plug member.

10. In a device of the class described, the combination with a plug member having a portion of uniform diameter, of a threaded sleeve member for attachment to a pipe in which the uniform diameter portion of the plug member is freely movable but makes a tight connection adjacent the pipe, and a packing gland to make a fluid-tight connection between the plug member and the sleeve and to hold the plug member at a predetermined position in the sleeve.

11. In a device of the class described, the combination with a plug member having a portion of uniform diameter, of a threaded sleeve member for attachment to a pipe in which the uniform diameter portion of the plug member is freely movable, a packing gland, means for holding the plug member at a specified place in the sleeve member, and packing material disposed between the gland, the sleeve and the plug member for forming a fluid-tight connection between the sleeve and the plug member when the gland is tightened.

12. A Pitot tube having static and dynamic tubes fixed with respect to each other, and a plug member with passages extending therethrough communicating at one end with the said tubes and having enlarged bores at the other end with straight recesses extending at right angles from the said bores in the face of the plug so that the plug can be used in a vertical or in a horizontal position.

13. The combination with a Pitot tube having static and dynamic tubes each with a plurality of openings spaced so that the distance from a central point of each tube to each opening is proportional to the square root of twice its numerical order minus 1 to transmit the pressure difference due to the mean velocity of flow in a pipe to which the Pitot tube is connected, and means for indicating the pressure difference connected to the Pitot tube.

14. The combination with a Pitot tube having static and dynamic tubes each with a plurality of openings spaced so that the distance between two successive openings in order $n_1$ and $n_2$ is proportional to the difference between the square root of $2n_1-1$ and the square root of $2n_2-1$ to transmit the pressure difference due to the mean velocity of flow in a pipe to which the Pitot tube is connected, of means for indicating the pressure difference, means for connecting the Pitot tube and the said indicating means, and pressure reservoirs in the said connecting means.

15. The combination with a Pitot tube comprising a plug member with longitudinal passageways and enlarged bores at the end, with passages at the end only connected at right angles to the first mentioned bores, of a perforated member having pipes extending therethrough adapted to communicate with either pair of bores, a washer having a single pair of perforations through which the said pipes extend into the bores, and means for securing the member and the said plug member together with the washer between them for making a fluid-tight connection.

In testimony whereof I have signed my name to this specification, in the presence of two subscribing witnesses, on this 27th day of March, A. D. 1915.

JACOB M. SPITZGLASS.

Witnesses:
KENT W. WONNELL,
CHARLES H. SEEM.

Copies of this patent may be obtained for five cents each, by addressing the "Commissioner of Patents, Washington, D. C."